(12) United States Patent
Talluri et al.

(10) Patent No.: US 6,385,251 B1
(45) Date of Patent: May 7, 2002

(54) ERROR RESILIENT VIDEO CODING USING REVERSIBLE VARIABLE LENGTH CODES (RVLCS)

(75) Inventors: Rajendra K. Talluri, Plano, TX (US); Jiangtao Wen, Los Angeles; John Villasenor, Santa Monica, both of CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/971,462

(22) Filed: Oct. 5, 2001

Related U.S. Application Data

(62) Division of application No. 09/040,676, filed on Mar. 18, 1998, now Pat. No. 6,304,607.
(60) Provisional application No. 60/041,398, filed on Mar. 18, 1997.

(51) Int. Cl.[7] .................................................. H04N 7/12
(52) U.S. Cl. .................................................. 375/240.27
(58) Field of Search ..................... 375/240.27, 240.01, 375/240.25, 240.26, 240.15; H04N 7/12

(56) References Cited

U.S. PATENT DOCUMENTS 5,680,129 A * 10/1997 Weinberger et al. .......... 341/65
5,742,289 A * 4/1998 Naylor et al. .......... 375/240.15
5,790,196 A * 8/1998 Sun et al. ............. 375/240.15

OTHER PUBLICATIONS

S. W. Golomb, "Run–Length Encodings," IEEE Transactions on Information Theory, vol. IT–12, pp. 399–401.*
R. F. Rice, "Practical Universal Noiseless Coding," SPIE, vol. 207, pp. 247–267.*
M. J. Weinberger et al, "LOCO–I: A Low Complexity, Context–Based, Lossless Image Compression Algorithm," IEEE Data Compression Conference, Snowbird, UT, pp. 140–149.*

* cited by examiner

Primary Examiner—Young Lee
(74) Attorney, Agent, or Firm—Carlton H. Hoel; W. James Brady; Frederick J. Telecky, Jr.

(57) ABSTRACT

Video compression coding with partitioning of data into motion vector data and texture data with reversible Golomb-Rice type codes for the data. Resynchronization markers separate the data types, and the reversible coding permits decoding in both forward and backward directions to minimize data discarded due to errors.

5 Claims, 2 Drawing Sheets

FIG. 1
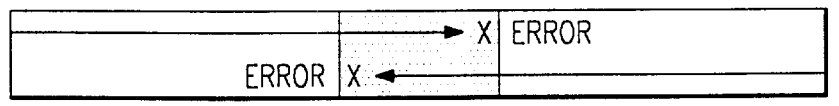
FIG. 2
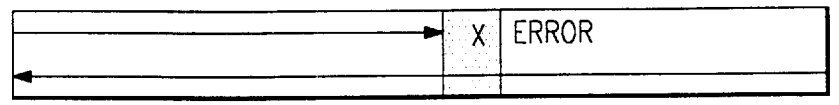
FIG. 3
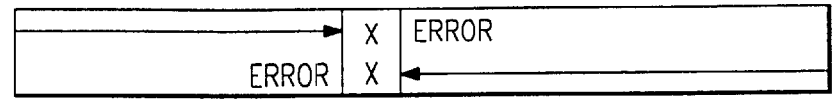
FIG. 4
| ESCAPE | LAST | RUN | LEVEL | ESCAPE |
|---|---|---|---|---|
| xx...x1 | x | xxxxxx | xxxxxxx | xx...xs |
| m BITS | 1 BIT | 6 BITS | 7 BITS | m BITS |
FIG. 5

| RESYNCH MARKER | MB NUMBER | QP | MOTION DATA | MOTION RESYNCH WORD | DCT DATA | RESYNCH MARKER |

*FIG. 6a*

| COD$_1$ | MCBPC$_1$ | MV$_1$ | COD$_2$ | MCBPC$_2$ | MV$_2$ | COD$_3$ | ... | MV$_n$ |

*FIG. 6b*

| CBPY$_1$ | DQUANT$_1$ | CBPY$_2$ | DQUANT$_2$ | DCT$_1$ | ... | DQUANT$_n$ | DCT$_n$ |

*FIG. 6c*

| RESYNCH MARKER | MB NUMBER | QP | HEADER DATA | HEADER RESYNCH WORD | MOTION VECTOR DATA | MOTION RESYNCH WORD | DCT HEADER DATA | DCT DATA | RESYNCH MARKER |

*FIG. 7*

ERROR RESILIENT VIDEO CODING USING REVERSIBLE VARIABLE LENGTH CODES (RVLCS)

CROSS-REFERENCE TO RELATED APPLICATIONS

Copending U.S. patent application Ser. No. 09/019,787, filed Feb. 6, 1998, discloses related subject matter. This application is a division of U.S. Ser. No. 09/040,676, filed Mar. 18, 1998, now U.S. Pat. No. 6,304,607, which claims benefit to U.S. Ser. No. 60/041,398, filed Mar. 18, 1999.

BACKGROUND

The present application relates to information encoding for transmission over noisy channels and storage, and more particularly to error resilient encoding.

Two common approaches to the mitigation of errors arising during the transmission of data over noisy channels exist: Automatic Retransmission Request (ARQ) and Forward Error Correction (FEC). ARQ type of mitigation typically would not be feasible in multicast or real-time applications such as video because of intolerable time delays or a lack of feedback channel. In such cases, a decoder can only decode the error corrupted bitstream, protected to an extent by error correction encoding, and must create from such bitstream. FEC provides mitigation by error correcting codes (e.g., Reed-Solomon). However, uncorrectable errors require further mitigated approaches.

In general, commonly used video compression methods have block-based motion compensation to remove temporal redundancy. Motion compensation methods encode only (macro)block motion vectors and the corresponding quantized residuals (texture); and variable length coding (VLC) of the motion vectors and residual increases coding efficiency. However, variable length coding often are highly susceptible to transmission channel errors and a decoder easily loses synchronization with the encoder when uncorrectable errors arise. The predictive coding methods, such as motion compensation, make matters much worse because the errors in one video frame quickly propagate across the entire video sequence and rapidly degrade the decoded video quality.

The typical approach of such block-based video compression methods to uncorrectable errors includes the steps of error detection (e.g., out-of-range motion vectors, invalid VLC table entry, or invalid number of residuals in a block), resynchronization of the decoder with the encoder, and error concealment by repetition of previously transmitted correct data in place of the uncorrectable data. For example, video compressed using MPEG1-2 has a resynchronization marker (start code) at the start of each slice of macroblocks (MBs) of a frame, and an uncorrectable error results in all of the data between correctly decoded resynchronization markers being discarded. This implies degradation in quality of the video stream, especially for predictive compression methods such as MPEG.

This compressed video is typically coded using Variable Length Code (VLC) tables such as Huffman codes. When the compressed video data is transmitted over noisy communication channels, it is corrupted by channel errors. VLC tables prove to be particularly sensitive to bit errors. This is because bit errors can make one codeword be incorrectly interpreted to be another codeword of a different length and hence the error is not detected. This makes the decoder lose synchronization with the encoder. Although the error may finally be detected due to an invalid VLC table entry, usually the location in the bitstream where the error is detected is not the same as the location where the error occurred. Hence, when the decoder detects an error, it has to seek the next resynchronization marker and discard all the data between this and the previous resynchronization marker. Thus, even a single bit error can sometimes result in a loss of a significant amount of data, and this is a problem of the known coding schemes.

Golomb-Rice codes (S. W. Golomb, "Run-length encodings," *IEEE Trans. Inf. Theory*, vol. IT-12, pp.399–401, July 1966 and R. F. Rice, "some practical universal noiseless coding techniques," *Tech. Rep.* JPL-79-22, Jet Propulsion Laboratory, Pasadena, Calif., March 1979) have been applied to lossless image compression; see M. J. Weinberger, G. Seroussi, and G. Sapiro, "LOCO-I: A low complexity, context based lossless image compression algorithm," *Proc. 1996 IEEE Data Comp. Conf.*, Snowbird, Utah, pp. 140–149, April, 1996.

These video compression and decompression methods may be implemented on special integrated circuits or on programmable digital signal processors or microprocessors.

SUMMARY OF THE INVENTION

The present invention uses reversible VLC (RVLC) tables based on Golomb-Rice codes to alleviate the error problems in motion compensated compressed video such as MPEG. These RVLC tables have the property that they can be uniquely decoded both in the forward and the backward (reverse) directions. This property enables a decoder to better isolate the location of the error and minimize the amount of data that needs to be discarded.

Preferred embodiments present different kinds RVLCs for each of (1) motion header data (COD+MCBPC) (for INTRA and INTER frames), (2) motion vector data, (3) INTRA DCT coefficient data. and (4) INTER DCT coefficient data.

This has the advantage of better performance with efficient codes.

BRIEF DESCRIPTION OF THE DRAWINGS

The drawings are heuristic for clarity.

FIGS. 1–4 shows error detection with reversible coding.

FIG. 5 shows syntax for fixed length code portions

FIGS. 6a–c shows a bitstream syntax for data partitioning.

FIG. 7 shows a bitstream syntax for data and header partitioning.

DESCRIPTION OF THE PREFERRED EMBODIMENTS

Data Partitioning

Enhanced error concealment properties for motion compensated compression, such as MPEG, can be achieved by using data partitioning. Consider a "video packet" to consist of the data between two consecutive resynchronization markers. In a data partitioning approach, the motion data and the texture (DCT) data within each of the video packets are separately encoded in the bitstream . Another resynchronization word (Motion Resync. Word) is imbedded between the motion data and the DCT data to signal the end of the motion data and the beginning of the DCT data. This data partitioning allows the decoder to use the motion data even if the DCT data is corrupted by undetectable errors. This provides advantages including partial recovery over uncorrectable error in a packet of compressed video data with little additional overhead. The error concealment that is made possible by the use of motion compensation by applying decoded motion vectors results in a much better decoded video quality. And this extends to object based compression in that object shape data can be separated from the motion data and texture data by a shape resynchronization word.

When using data partitioning the data within the video packet is organized to look as shown in FIGS. 6a–c: FIG. 6a shows the fields between two resynchronization markers and FIGS. 6b–c illustrate the motion data field and the texture data field in more detail by an example. In particular, the first field ("Resynch Marker") is a resynchronization marker, the second field ("MB No.") is the number in the frame of the first macroblock (16×16 block of pixels) in the video packet, the third field ("QP") is the default quantization parameter used to quantize the texture data (DCT coefficients) in the video packet, the fourth field ("Motion Data") is the motion data, the fifth field ("Motion Resynch Word") is the resynchronization marker between the motion data and the texture data, the sixth field ("DCT Data") is the texture data, and the last field ("Resynch Marker") is the ending resynchronization marker. Note that the resynchronization marker is taken to have 23 successive 0s, and that these resynchronization words can be created by a search process as described in copending U.S. patent application Ser. No. 09/019,787, filed Feb. 6, 1998.

FIG. 6b shows the motion data field consisting of a COD field, an MCBPC field, and an MV field for each the macroblocks in the packet. The COD field indicates whether the macroblock is coded or skipped (COD=0 macroblock is coded, COD=1 macroblock is skipped). The MCBPC field indicates (1) the mode of the macroblock and (2) which of the chrominance blocks in the macroblock are coded and which are skipped: the mode indicates whether there the current macroblock is coded INTRA (no motion compensation), INTER (motion compensated with one 16×16 motion vector), or INTER4V (motion compensated with four 8×8 motion vectors). Of course, if COD indicates the macroblock is not coded, then the MCBPC field is not present. The MV field is the actual motion vector data; either one vector or four vectors. Again, if COD indicates that the macroblock is not coded, then the MV field is not present.

FIG. 6c shows the texture (DCT Data) field as consisting of a CBPY field and a DQUANT field for each of the macroblocks followed by the DCT data for each of the macroblocks. The CBPY field indicates which of the luminance blocks of the macroblock are coded and which are skipped. The DQUANT field indicates the differential increment to the default quantizer value (QP) to compute the quantization value for the macroblock. The DCT fields are the run length encoded quantized DCT coefficient values of the macroblock.

Reversible VLC With Header

The preferred embodiment syntax of the bitstream within a video packet with headers and data using RVLC is shown in FIG. 7. The Resynch Marker, MB No., QP, and Motion Resynchr Word fields are as in FIG. 6a; the Motion Vector Data field consists of the motion vector data MV1, MV2, . . . MVn as in FIG. 6b; the DCT Header Data field consists of the CBPY1, DQUANT1, . . . , CBPYn, DQUANTn of FIG. 6c; and the DCT Data field consists of the DCT1, DCT2, . . . , DCTn also of FIG. 6c.

The Header Data field consists of one RVLC entry for the combined COD and MCBPC data for each macroblock (see FIG. 6b), and the Header Resynchronization Word is a uniquely decoded word similar to the Motion Resynchronizatin Word. Thus sequences of RVLC entries occur in the Header Data, Motion Vector Data, DCT Header Data, and DCT Data fields; of course each field has its own RVLC table as detailed below.

If an error is detected by the decoder while decoding any of the RVLCs, the decoder seeks the next resynchronization word, (either Header Resync. Word or Motion Resync. Word or the Resync. Marker). It then decodes the RVLC data backwards. Now, one of the four possible cases shown below can occur and the decoder decides to discard the appropriate part of the bitstream shown shaded in the figures below.

Note that during the backward decoding, in addition to the usual checks for valid data, the decoder also flags the bitstream as being in error if the forward decoded and the backward decoded data do not match despite both directions being decoded without apparent errors.

1) Separated error detected points: MBs whose data are free from errors are used. The data between the error detected points in the forward decode and in the backward decode are discarded (shaded part in FIG. 1).

2) Crossed error detected points: MBs whose data are free from errors are used. The data between the error detected points in the forward decode and in the backward decode are discarded (dark part in FIG. 2).

3) Error is detected in one direction: The MB whose data is corrupted (shaded part in FIG. 3) is discarded. The symmetrical situation of no error in the forward direction but an error in the reverse direction is treated similarly.

4) Error is detected in the same MB: Only the corrupted MB (shaded part in FIG. 4) is discarded.

In all of the cases above using the RVLC and the reverse (backward) decoding, the decoder is able to salvage a significantly larger part of the bitstream that is not in error.

Design of the RVLCs

The preferred embodiment parameterized RVLCs have identical code length distributions to previously known, non-reversible VLCs that are known to be near-optimal for probability density functions (pdfs) that occur in coding of image data. The RVLCs presented are parameterized to allow them to be adapted to match a wide range of pdfs, and enable the advantages of two-way decoding while retaining the efficiency of traditional (non-reversible) variable length codes.

Begin with a reversible code with the same length distribution as GolombRice codes, which have recently been applied for coding of prediction errors in lossless image coding applications as noted in the background. Golomb-Rice codes are nearly optimal for coding of exponentially distributed non-negative integers, and describe an integer n in terms of a quotient and a remainder. For simplicity, the divisor is often chosen to be a power of 2, i.e., $2^k$, and is parameterized by k. The quotient can be arbitrarily large and is expressed using a unary representation; the remainder is bounded by the range $[0,2^{k-1}]$ and is expressed in binary form using k bits. For example, for a Golomb-Rice code with k=2 the number 9 could be represented as 110 01. The "prefix" of the codeword, 110, identifies the quotient of $9/2^2$ as having value 2. The "suffix", 01, is a 2-bit binary expression of the remainder. Table 2 below gives Golomb-Rice codes for the first several integers for two choices of the parameter k.

To obtain an equivalent length reversible code, one can simply replace the prefix of each Golomb-Rice codeword with a prefix that begins and ends with a "1", with all other bits equal to "0". The exception to this is the prefix of length one, which is set to "0". The suffix in the RVLC remains the same as the suffix in the corresponding Golomb-Rice code. RVLCs constructed according to these rules are shown Table 1 for k=1 and k=2, and it is clear from the table that the length distributions of the RVLCs and the corresponding Golomb-Rice codes are identical. Although it is only the prefix, as opposed to the entire codeword, that is symmetric, these codes can easily be decoded bidirectionally because the nonreversible portions of the codewords have fixed length.

In contrast with the Golomb-Rice code in which the number of codewords at each length is constant, it is also possible to construct codes in which the number of codewords of a given length grows exponentially with length. Compression of run lengths using such codes was described in a paper by Teuhola (J.Teuhola, "A compression method for clustered bit-vectors," *Information Processing Letters*, vol.7, pp308–311, October, 1978) using the term "exponential-Golomb" coding. Exp-Golomb codes are matched to pdfs having a higher peak and wider tails than typical exponential pdfs. Such a pdf is very well matched to the run-length coded data that occur in quantized image transforms. Exp-Golomb codes can be parameterized according to k, the number of bits in the suffix of the codeword. Table 2 illustrates the exp-Golomb code for k=1,2. It is possible, though less straightforward, to construct a reversible code that has the same length distribution as an exp-Golomb code. To do this again impose the constraint that the first and last bits of the prefix be "1.". As before, the prefix of length one is set to "0". Require that all odd-indexed bits in the prefix, with the exception of the first and last bit, be "0". For example, in all prefixes of length 5, the third bit is "0", and the first and fifth bits are "1". The even-indexed bits are allowed to vary arbitrarily, allowing $2^{(l-1)/2}$ possible prefixes of length l, where l is odd. In constructing the code, each prefix is concatenated with the $2^k$ distinct suffixes of length k. Table 2 gives an RVLC constructed according to these rules. Again, it is clear that the length distribution of the RVLC is identical to that of the corresponding nonreversible code.

TABLE 1

Parameterized Golomb-Rice Code and Reversible Golomb-Rice Code

| | k = 1 | | | | k = 2 | | | |
|---|---|---|---|---|---|---|---|---|
| | Golomb-Rice | | PRVLC | | Golomb-Rice | | PRVLC | |
| Index | Prefix | Suffix | Prefix | Suffix | Prefix | Suffix | Prefix | Suffix |
| 0 | 0 | 0 | 0 | 0 | 0 | 00 | 0 | 00 |
| 1 | 0 | 1 | 0 | 1 | 0 | 01 | 0 | 01 |
| 2 | 10 | 0 | 11 | 0 | 0 | 10 | 0 | 10 |
| 3 | 10 | 1 | 11 | 1 | 0 | 11 | 0 | 11 |
| 4 | 110 | 0 | 101 | 0 | 10 | 00 | 11 | 00 |
| 5 | 110 | 1 | 101 | 1 | 10 | 01 | 11 | 01 |
| 6 | 1110 | 0 | 1001 | 0 | 10 | 10 | 11 | 10 |
| 7 | 1110 | 1 | 1001 | 1 | 10 | 11 | 11 | 11 |
| ... | ... | ... | ... | ... | ... | ... | ... | ... |

TABLE 2

Parameterized Exp-Golomb Code and Reversible Exp-Golomb Code (the bits in the RVLC that are not subject to symmetry constraints are italicized)

| | k = 1 | | | | k = 2 | | | |
|---|---|---|---|---|---|---|---|---|
| | Exp-Golomb | | PRVLC | | Exp-Golomb | | PRVLC | |
| Index | Prefix | Suffix | Prefix | Suffix | Prefix | Suffix | Prefix | Suffix |
| 0 | 0 | 0 | 0 | 0 | 0 | 00 | 0 | 00 |
| 1 | 0 | 1 | 0 | 1 | 0 | 01 | 0 | 01 |
| 2 | 100 | 0 | 101 | 0 | 0 | 10 | 0 | 10 |
| 3 | 100 | 1 | 101 | 1 | 0 | 11 | 0 | 11 |
| 4 | 101 | 0 | 111 | 0 | 100 | 00 | 101 | 00 |
| 5 | 101 | 1 | 111 | 1 | 100 | 01 | 101 | 01 |
| 6 | 11000 | 0 | 10001 | 0 | 100 | 10 | 101 | 10 |
| 7 | 11000 | 1 | 10001 | 1 | 100 | 11 | 101 | 11 |
| 8 | 11001 | 0 | 10011 | 0 | 101 | 00 | 111 | 00 |
| 9 | 11001 | 1 | 10011 | 1 | 101 | 01 | 111 | 01 |
| 10 | 11010 | 0 | 11001 | 0 | 101 | 10 | 111 | 10 |
| 11 | 11010 | 1 | 11001 | 1 | 101 | 11 | 111 | 11 |
| 12 | 11011 | 0 | 11011 | 0 | 11000 | 00 | 10001 | 00 |
| 13 | 11011 | 1 | 11011 | 1 | 11000 | 01 | 10001 | 01 |
| ... | ... | ... | ... | ... | ... | ... | ... | ... |

Design the complete codeword table as follows.
1. Make the probability table of most commonly occurring EVENTs.
2. For each k, assign codewords from the corresponding RVLC table to the EVENTs, with shorter codeword mapped to EVENT of higher probability. Then select the k, that gives the shortest average length.

Using this methodology the RVLCs were designed for each of (1) Header Data (COD+MCBPC) (for both INTRA and INTER frames), (2) Motion Vector Data, (3) INTRA frame DCT Data, and (4) INTER frame DCT Data. Use two classes of RVLCs. The first class of RVLC is used to code the header information (COD+MCBPC). One RVLC is used for the INTRA frames and one is used for the INTER frames. These are shown in Table 3 and Table 4 below.

TABLE 3

RVLC for COD + MCBPC for INTRA coded video packets

| | | | RVLC for Header Data COD + MCBPC | |
|---|---|---|---|---|
| Index | MB Type | CBPC (56) | Codeword (Combined) | Length (Bits) |
| 0 | — | — | 1 | 1 |
| 1 | 3 | 00 | 00 | 2 |
| 2 | 3 | 01 | 0110 | 4 |
| 3 | 3 | 10 | 01110 | 5 |
| 4 | 3 | 11 | 01010 | 5 |
| 5 | 4 | 00 | 011110 | 6 |
| 6 | 4 | 01 | 010010 | 6 |
| 7 | 4 | 10 | 0111110 | 7 |
| 8 | 4 | 11 | 0100010 | 7 |
| 9 | Stuffing | — | 0111111110 | 10 |

TABLE 4

RVLC for COD + MCBPC for INTER coded video packets

| | | | Proposed RVLC for Combined COD + MCBPC | |
|---|---|---|---|---|
| Index | MB Type | CBPC (56) | Codeword (Combined) | Length (Bits) |
| 0 | — | — | 1 | 1 |
| 1 | 0 | 00 | 010 | 2 |
| 2 | 0 | 01 | 011110 | 6 |
| 3 | 0 | 10 | 001100 | 6 |
| 4 | 0 | 11 | 0111110 | 7 |
| 5 | 1 | 00 | 0110 | 4 |
| 6 | 1 | 01 | 01111110 | 8 |
| 7 | 1 | 10 | 00111100 | 8 |
| 8 | 1 | 11 | 011111110 | 9 |
| 9 | 2 | 00 | 01110 | 5 |
| 10 | 2 | 01 | 00111100 | 8 |
| 11 | 2 | 10 | 001111100 | 9 |
| 12 | 2 | 11 | 000111000 | 9 |
| 13 | 3 | 00 | 0011100 | 7 |
| 14 | 3 | 01 | 0111111110 | 10 |
| 15 | 3 | 10 | 0011111100 | 10 |
| 16 | 3 | 11 | 000010000 | 9 |
| 17 | 4 | 00 | 0001000 | 7 |
| 18 | 4 | 01 | 0001111000 | 10 |
| 19 | 4 | 10 | 00111111100 | 11 |

TABLE 4-continued

RVLC for COD + MCBPC for INTER coded video packets

| | | | Proposed RVLC for Combined COD + MCBPC | |
|---|---|---|---|---|
| Index | MB Type | CBPC (56) | Codeword (Combined) | Length (Bits) |
| 20 | 4 | 11 | 01111111110 | 11 |
| 21 | Stuffing | — | 0000110000 | 10 |

The second class is an RVLC, which can be parameterized by a parameter k, will be used for the entropy coding of quantized DCT coefficients and also the coding of the motion vector data. Table 7 gives the code tables for the most commonly occurring EVENTs and codewords for k=1 and k=2 for the DCT efficients. In the table and generally, the last bit "s" denotes the sign of the level, "0" for positive and "1" for negative. The remaining EVENTs are coded with a fixed length code (FLC), as depicted in Error! Reference source not found. and Tables 5–6. Table 8 gives the code table for the motion vector data.

TABLE 5

FLC Table for RUN

| RUN | CODE |
|---|---|
| 0 | 000000 |
| 1 | 000001 |
| 2 | 000010 |
| . | . . . |
| . | . . . |
| . | . . . |
| 63 | 111111 |

TABLE 6

FLC table for Level

| LEVEL | CODE |
|---|---|
| 0 | FORBIDDEN |
| 1 | 0000000 |
| 2 | 0000001 |
| . | . . . |
| . | . . . |
| 127 | 1111111 |

TABLE 7

RVLCs for the DCT Coefficients. The INTRA column shall be used for INTRA luminance and the INTER column for INTER and INTRA chrominance and INTER luminance

| | Intra | | | Inter | | | | |
|---|---|---|---|---|---|---|---|---|
| Index | Last | Run | Level | Last | Run | Level | RVLC when k = 1 | RVLC when k = 2 |
| 0 | 0 | 0 | 1 | 0 | 0 | 1 | 1s | 11s |
| 1 | 0 | 0 | 2 | 0 | 1 | 1 | 010s | 10s |
| 2 | 0 | 0 | 0 | 0 | 0 | 0 | 0001 ESCAPE | 00001 ESCAPE |

TABLE 7-continued

RVLCs for the DCT Coefficients. The INTRA column shall be used for INTRA luminance and the INTER column for INTER and INTRA chrominance and INTER luminance

| | Intra | | | Inter | | | | |
|---|---|---|---|---|---|---|---|---|
| Index | Last | Run | Level | Last | Run | Level | RVLC when k = 1 | RVLC when k = 2 |
| 3 | 0 | 0 | 3 | 0 | 0 | 2 | 01110s | 0100s |
| 4 | 0 | 0 | 4 | 0 | 0 | 3 | 01100s | 0001s |
| 5 | 0 | 0 | 5 | 0 | 1 | 2 | 00110s | 0101s |
| 6 | 0 | 1 | 1 | 0 | 2 | 1 | 00100s | 011101s |
| 7 | 0 | 1 | 2 | 0 | 3 | 1 | 0111110s | 011100s |
| 8 | 0 | 2 | 1 | 0 | 4 | 1 | 0111100s | 011001s |
| 9 | 1 | 0 | 1 | 1 | 0 | 1 | 0110110s | 011000s |
| 10 | 0 | 0 | 6 | 0 | 0 | 4 | 0110100s | 001101s |
| 11 | 0 | 0 | 7 | 0 | 0 | 5 | 0011110s | 001100s |
| 12 | 0 | 0 | 8 | 0 | 0 | 6 | 0011100s | 001001s |
| 13 | 0 | 0 | 9 | 0 | 0 | 7 | 0010110s | 001000s |
| 14 | 0 | 0 | 10 | 0 | 1 | 3 | 0010100s | 01111101s |
| 15 | 0 | 0 | 11 | 0 | 1 | 4 | 011111110s | 01111100s |
| 16 | 0 | 1 | 3 | 0 | 2 | 2 | 011111100s | 01111001s |
| 17 | 0 | 1 | 4 | 0 | 3 | 2 | 011110110s | 01111000s |
| 18 | 0 | 1 | 5 | 0 | 4 | 2 | 011110100s | 01101101s |
| 19 | 0 | 2 | 2 | 0 | 5 | 1 | 011011110s | 01101100s |
| 20 | 0 | 3 | 1 | 0 | 5 | 2 | 011011100s | 01101001s |
| 21 | 0 | 3 | 2 | 0 | 6 | 1 | 011010110s | 01101000s |
| 22 | 0 | 4 | 1 | 0 | 7 | 1 | 011010100s | 00111101s |
| 23 | 0 | 5 | 1 | 0 | 8 | 1 | 001111110s | 00111100s |
| 24 | 0 | 6 | 1 | 0 | 9 | 1 | 001111100s | 00111001s |
| 25 | 0 | 7 | 1 | 0 | 10 | 1 | 001110110s | 00111000s |
| 26 | 0 | 8 | 1 | 0 | 11 | 1 | 001110100s | 00101101s |
| 27 | 1 | 0 | 2 | 1 | 0 | 2 | 001011110s | 00101100s |
| 28 | 1 | 1 | 1 | 1 | 1 | 1 | 001011100s | 00101001s |
| 29 | 1 | 1 | 2 | 1 | 2 | 1 | 001010110s | 00101000s |
| 30 | 1 | 2 | 1 | 1 | 3 | 1 | 001010100s | 0111111101s |
| 31 | 1 | 3 | 1 | 1 | 4 | 1 | 01111111110s | 0111111100s |
| 32 | 1 | 4 | 1 | 1 | 5 | 1 | 01111111100s | 0111111001s |
| 33 | 1 | 5 | 1 | 1 | 6 | 1 | 01111110110s | 0111111000s |
| 34 | 1 | 6 | 1 | 1 | 7 | 1 | 01111110100s | 0111101101s |
| 35 | 1 | 7 | 1 | 1 | 8 | 1 | 01111011110s | 0111101100s |
| 36 | 1 | 8 | 1 | 1 | 9 | 1 | 01111011100s | 0111101001s |
| 37 | 1 | 9 | 1 | 1 | 10 | 1 | 01111010110s | 0111101000s |
| 38 | 1 | 10 | 1 | 1 | 11 | 1 | 01111010100s | 0110111101s |
| 39 | 1 | 11 | 1 | 1 | 12 | 1 | 01101111110s | 0110111100s |
| 40 | 1 | 12 | 1 | 1 | 13 | 1 | 01101111100s | 0110111001s |
| 41 | 1 | 13 | 1 | 1 | 14 | 1 | 01101110110s | 0110111000s |
| 42 | 0 | 0 | 12 | 0 | 0 | 8 | 01101110100s | 0110101101s |
| 43 | 0 | 0 | 13 | 0 | 0 | 9 | 01101011110s | 0110101100s |
| 44 | 0 | 0 | 14 | 0 | 0 | 10 | 01101011100s | 0110101001s |
| 45 | 0 | 0 | 15 | 0 | 0 | 11 | 01101010110s | 0110101000s |
| 46 | 0 | 0 | 16 | 0 | 0 | 12 | 01101010100s | 0011111101s |
| 47 | 0 | 0 | 17 | 0 | 0 | 13 | 00111111110s | 0011111100s |
| 48 | 0 | 0 | 18 | 0 | 0 | 14 | 00111111100s | 0011111001s |
| 49 | 0 | 0 | 19 | 0 | 0 | 15 | 00111110110s | 0011111000s |
| 50 | 0 | 0 | 20 | 0 | 0 | 16 | 00111110100s | 0011101101s |
| 51 | 0 | 0 | 21 | 0 | 0 | 17 | 00111011110s | 0011101100s |
| 52 | 0 | 0 | 22 | 0 | 0 | 18 | 00111011100s | 0011101001s |
| 53 | 0 | 0 | 23 | 0 | 0 | 19 | 00111010110s | 0011101000s |
| 54 | 0 | 0 | 24 | 0 | 0 | 20 | 00111010100s | 0010111101s |
| 55 | 0 | 0 | 25 | 0 | 0 | 21 | 00101111110s | 0010111100s |
| 56 | 0 | 0 | 26 | 0 | 0 | 22 | 00101111100s | 0010111001s |
| 57 | 0 | 0 | 27 | 0 | 0 | 23 | 00101110110s | 0010111000s |
| 58 | 0 | 0 | 28 | 0 | 0 | 24 | 00101110100s | 0010101101s |
| 59 | 0 | 0 | 29 | 0 | 0 | 25 | 00101011110s | 0010101100s |
| 60 | 0 | 0 | 30 | 0 | 0 | 26 | 00101011100s | 0010101001s |
| 61 | 0 | 0 | 31 | 0 | 0 | 27 | 00101010110s | 0010101000s |
| 62 | 0 | 0 | 32 | 0 | 1 | 5 | 00101010100s | 011111111101s |
| 63 | 0 | 0 | 33 | 0 | 1 | 6 | 0111111111110s | 011111111100s |
| 64 | 0 | 0 | 34 | 0 | 1 | 7 | 0111111111100s | 011111111001s |
| 65 | 0 | 1 | 6 | 0 | 1 | 8 | 0111111110110s | 011111111000s |
| 66 | 0 | 1 | 7 | 0 | 1 | 9 | 0111111110100s | 011111101101s |
| 67 | 0 | 1 | 8 | 0 | 1 | 10 | 0111111011110s | 011111101100s |
| 68 | 0 | 1 | 9 | 0 | 1 | 11 | 0111111011100s | 011111101001s |
| 69 | 0 | 1 | 10 | 0 | 1 | 12 | 0111111010110s | 011111101000s |
| 70 | 0 | 1 | 11 | 0 | 2 | 3 | 0111111010100s | 011110111101s |
| 71 | 0 | 1 | 12 | 0 | 2 | 4 | 0111101111110s | 011110111100s |
| 72 | 0 | 1 | 13 | 0 | 2 | 5 | 0111101111100s | 011110111001s |

TABLE 7-continued

RVLCs for the DCT Coefficients. The INTRA column shall be used for INTRA luminance and the INTER column for INTER and INTRA chrominance and INTER luminance

| | Intra | | | Inter | | | | |
|---|---|---|---|---|---|---|---|---|
| Index | Last | Run | Level | Last | Run | Level | RVLC when k = 1 | RVLC when k = 2 |
| 73 | 0 | 1 | 14 | 0 | 2 | 6 | 0111101110110s | 011110111000s |
| 74 | 0 | 1 | 15 | 0 | 2 | 7 | 0111101110100s | 011110101101s |
| 75 | 0 | 1 | 16 | 0 | 2 | 8 | 0111101011110s | 011110101100s |
| 76 | 0 | 2 | 3 | 0 | 3 | 3 | 0111101011100s | 011110101001s |
| 77 | 0 | 2 | 4 | 0 | 3 | 4 | 0111101010110s | 011110101000s |
| 78 | 0 | 2 | 5 | 0 | 3 | 5 | 0111101010100s | 011011111101s |
| 79 | 0 | 2 | 6 | 0 | 3 | 6 | 0110111111110s | 011011111100s |
| 80 | 0 | 2 | 7 | 0 | 4 | 3 | 0110111111100s | 011011111001s |
| 81 | 0 | 2 | 8 | 0 | 4 | 4 | 0110111110110s | 011011111000s |
| 82 | 0 | 3 | 3 | 0 | 4 | 5 | 0110111110100s | 011011101101s |
| 83 | 0 | 3 | 4 | 0 | 5 | 3 | 0110111011110s | 011011101100s |
| 84 | 0 | 3 | 5 | 0 | 5 | 4 | 0110111011100s | 011011101001s |
| 85 | 0 | 3 | 6 | 0 | 5 | 5 | 0110111010110s | 011011101000s |
| 86 | 0 | 3 | 7 | 0 | 6 | 2 | 0110111010100s | 011010111101s |
| 87 | 0 | 3 | 8 | 0 | 6 | 3 | 0110101111110s | 011010111100s |
| 88 | 0 | 3 | 9 | 0 | 6 | 4 | 0110101111100s | 011010111001s |
| 89 | 0 | 4 | 2 | 0 | 7 | 2 | 0110101110110s | 011010111000s |
| 90 | 0 | 4 | 3 | 0 | 7 | 3 | 0110101110100s | 011010101101s |
| 91 | 0 | 4 | 4 | 0 | 7 | 4 | 0110101011110s | 011010101100s |
| 92 | 0 | 4 | 5 | 0 | 8 | 2 | 0110101011100s | 011010101001s |
| 93 | 0 | 5 | 2 | 0 | 8 | 3 | 0110101010110s | 011010101000s |
| 94 | 0 | 5 | 3 | 0 | 8 | 4 | 0110101010100s | 001111111101s |
| 95 | 0 | 5 | 4 | 0 | 9 | 2 | 0011111111110s | 001111111100s |
| 96 | 0 | 5 | 5 | 0 | 9 | 3 | 0011111111100s | 001111111001s |
| 97 | 0 | 5 | 6 | 0 | 9 | 4 | 0011111110110s | 001111111000s |
| 98 | 0 | 5 | 7 | 0 | 10 | 2 | 0011111110100s | 001111101101s |
| 99 | 0 | 5 | 8 | 0 | 10 | 3 | 0011111011110s | 001111101100s |
| 100 | 0 | 6 | 2 | 0 | 11 | 2 | 0011111011100s | 001111101001s |
| 101 | 0 | 6 | 3 | 0 | 12 | 1 | 0011111010110s | 001111101000s |
| 102 | 0 | 6 | 4 | 0 | 12 | 2 | 0011111010100s | 001110111101s |
| 103 | 0 | 7 | 2 | 0 | 13 | 1 | 0011101111110s | 001110111100s |
| 104 | 0 | 7 | 3 | 0 | 13 | 2 | 0011101111100s | 001110111001s |
| 105 | 0 | 7 | 4 | 0 | 14 | 1 | 0011101110110s | 001110111000s |
| 106 | 0 | 7 | 5 | 0 | 14 | 2 | 0011101110100s | 001110101101s |
| 107 | 0 | 7 | 7 | 0 | 15 | 1 | 0011101011110s | 001110101100s |
| 108 | 0 | 8 | 2 | 0 | 15 | 2 | 0011101011100s | 001110101001s |
| 109 | 0 | 8 | 3 | 0 | 16 | 1 | 0011101010110s | 001110101000s |
| 110 | 0 | 9 | 1 | 0 | 17 | 1 | 0011101010100s | 001011111101s |
| 111 | 0 | 9 | 2 | 0 | 18 | 1 | 0010111111110s | 001011111100s |
| 112 | 0 | 9 | 3 | 0 | 19 | 1 | 0010111111100s | 001011111001s |
| 113 | 0 | 9 | 4 | 0 | 20 | 1 | 0010111110110s | 001011111000s |
| 114 | 0 | 9 | 5 | 0 | 21 | 1 | 0010111110100s | 001011101101s |
| 115 | 0 | 10 | 1 | 0 | 22 | 1 | 0010111011110s | 001011101100s |
| 116 | 0 | 10 | 2 | 0 | 23 | 1 | 0010111011100s | 001011101001s |
| 117 | 0 | 11 | 1 | 0 | 24 | 1 | 0010111010110s | 001011101000s |
| 118 | 0 | 11 | 2 | 0 | 25 | 1 | 0010111010100s | 001010111101s |
| 119 | 0 | 12 | 1 | 0 | 26 | 1 | 0010101111110s | 001010111100s |
| 120 | 0 | 13 | 1 | 0 | 27 | 1 | 0010101111100s | 001010111001s |
| 121 | 0 | 14 | 1 | 0 | 30 | 1 | 0010101110110s | 001010111000s |
| 122 | 0 | 15 | 1 | 0 | 31 | 1 | 0010101110100s | 001010101101s |
| 123 | 0 | 16 | 1 | 0 | 32 | 1 | 0010101011110s | 001010101100s |
| 124 | 1 | 0 | 3 | 1 | 0 | 3 | 0010101011100s | 001010101001s |
| 125 | 1 | 0 | 4 | 1 | 0 | 4 | 0010101010110s | 001010101000s |
| 126 | 1 | 0 | 5 | 1 | 0 | 5 | 0010101010100s | 011111111101s |
| 127 | 1 | 0 | 6 | 1 | 1 | 2 | 0111111111110s | 011111111100s |
| 128 | 1 | 1 | 3 | 1 | 1 | 3 | 0111111111100s | 011111111001s |
| 129 | 1 | 1 | 4 | 1 | 2 | 2 | 0111111110110s | 011111111000s |
| 130 | 1 | 1 | 5 | 1 | 2 | 3 | 0111111110100s | 011111101101s |
| 131 | 1 | 1 | 6 | 1 | 3 | 2 | 0111111111011110s | 011111101100s |
| 132 | 1 | 2 | 2 | 1 | 4 | 2 | 0111111111011100s | 011111101001s |
| 133 | 1 | 2 | 3 | 1 | 5 | 2 | 0111111111010110s | 011111101000s |
| 134 | 1 | 3 | 2 | 1 | 6 | 2 | 0111111111010100s | 011111101101s |
| 135 | 1 | 3 | 3 | 1 | 7 | 2 | 0111111101111110s | 011111101100s |
| 136 | 1 | 4 | 2 | 1 | 8 | 2 | 0111111101111100s | 011111101001s |
| 137 | 1 | 5 | 2 | 1 | 9 | 2 | 0111111101110110s | 011111101000s |
| 138 | 1 | 5 | 3 | 1 | 10 | 2 | 0111111101110100s | 011111101101s |
| 139 | 1 | 6 | 2 | 1 | 11 | 2 | 0111111101011110s | 011111101100s |
| 140 | 1 | 6 | 3 | 1 | 12 | 2 | 0111111101011100s | 011111101001s |
| 141 | 1 | 7 | 2 | 1 | 13 | 2 | 0111111101010110s | 011111101000s |
| 142 | 1 | 7 | 3 | 1 | 15 | 1 | 0111111101010100s | 011110111101s |
| 143 | 1 | 8 | 2 | 1 | 16 | 1 | 0111110111111110s | 011110111100s |

TABLE 7-continued

RVLCs for the DCT Coefficients. The INTRA column shall be used for INTRA luminance and the INTER column for INTER and INTRA chrominance and INTER luminance

| | Intra | | | Inter | | | | |
|---|---|---|---|---|---|---|---|---|
| Index | Last | Run | Level | Last | Run | Level | RVLC when k = 1 | RVLC when k = 2 |
| 144 | 1 | 9 | 2 | 1 | 17 | 1 | 011110111111100s | 01111011111001s |
| 145 | 1 | 9 | 3 | 1 | 18 | 1 | 011110111110110s | 01111011111000s |
| 146 | 1 | 10 | 2 | 1 | 19 | 1 | 011110111110100s | 01111011101101s |
| 147 | 1 | 11 | 2 | 1 | 20 | 1 | 011110111011110s | 01111011101100s |
| 148 | 1 | 11 | 3 | 1 | 21 | 1 | 011110111011100s | 01111011101001s |
| 149 | 1 | 12 | 2 | 1 | 22 | 1 | 011110111010110s | 01111011101000s |
| 150 | 1 | 13 | 2 | 1 | 23 | 1 | 011110111010100s | 01111010111101s |
| 151 | 1 | 13 | 3 | 1 | 24 | 1 | 011110101111110s | 01111010111100s |
| 152 | 1 | 13 | 4 | 1 | 25 | 1 | 011110101111100s | 01111010111001s |
| 153 | 1 | 14 | 1 | 1 | 26 | 1 | 011110101110110s | 01111010111000s |
| 154 | 1 | 14 | 2 | 1 | 27 | 1 | 011110101110100s | 01111010101101s |
| 155 | 1 | 15 | 1 | 1 | 28 | 1 | 011110101011110s | 01111010101100s |
| 156 | 1 | 16 | 1 | 1 | 29 | 1 | 011110101011100s | 01111010101001s |
| 157 | 1 | 17 | 1 | 1 | 30 | 1 | 011110101010110s | 01111010101000s |
| 158 | 1 | 18 | 1 | 1 | 31 | 1 | 011110101010100s | 01101111111101s |
| 159 | 1 | 19 | 1 | 1 | 32 | 1 | 011011111111110s | 01101111111100s |
| 160 | 1 | 20 | 1 | 1 | 33 | 1 | 011011111111100s | 01101111111001s |
| 161 | 1 | 21 | 1 | 1 | 34 | 1 | 011011111110110s | 01101111111000s |
| 162 | 1 | 22 | 1 | 1 | 35 | 1 | 011011111110100s | 01101111101101s |
| 163 | 1 | 23 | 1 | 1 | 36 | 1 | 011011111011110s | 01101111101100s |
| 164 | 1 | 24 | 1 | 1 | 37 | 1 | 011011111011100s | 01101111101001s |
| 165 | 1 | 25 | 1 | 1 | 38 | 1 | 011011111010110s | 01101111101000s |
| 166 | 1 | 26 | 1 | 1 | 39 | 1 | 011011111010100s | 01101110111101s |
| 167 | 1 | 27 | 1 | 1 | 40 | 1 | 011011101111110s | 01101110111100s |
| 168 | 1 | 28 | 1 | 1 | 45 | 1 | 011011101111100s | 01101110111001s |
| 169 | 1 | 30 | 1 | 1 | 46 | 1 | 011011101110110s | 01101110111000s |

TABLE 8

RVLCs for the Motion Vector Data

| Absolute Value of Motion Vector Component (Vertical or Horizontal) | RVLC with k = 1 | | RVLC with k = 2 | |
|---|---|---|---|---|
| | code | length | code | length |
| 0 | 01 | 2 | 001 | 3 |
| 1 | 101s | 4 | 01s | 3 |
| 2 | 111s | 4 | 1010s | 5 |
| 3 | 10001s | 6 | 1011s | 5 |
| 4 | 10011s | 6 | 1110s | 5 |
| 5 | 11001s | 6 | 1111s | 5 |
| 6 | 11011s | 6 | 100010s | 7 |
| 7 | 1000001s | 8 | 100011s | 7 |
| 8 | 1000011s | 8 | 100110s | 7 |
| 9 | 1001001s | 8 | 100111s | 7 |
| 10 | 1001011s | 8 | 110010s | 7 |
| 11 | 1100001s | 8 | 110011s | 7 |
| 12 | 1100011s | 8 | 110110s | 7 |
| 13 | 1101001s | 8 | 110111s | 7 |
| 14 | 1101011s | 8 | 10000010s | 9 |
| 15 | 100000001s | 10 | 10000011s | 9 |
| 16 | 100000011s | 10 | 10000110s | 9 |
| 17 | 100001001s | 10 | 10000111s | 9 |
| 18 | 100001011s | 10 | 10010010s | 9 |
| 19 | 100100001s | 10 | 10010011s | 9 |
| 20 | 100100011s | 10 | 10010110s | 9 |
| 21 | 100101001s | 10 | 10010111s | 9 |
| 22 | 100101011s | 10 | 11000010s | 9 |
| 23 | 110000001s | 10 | 11000011s | 9 |
| 24 | 110000011s | 10 | 11000110s | 9 |
| 25 | 110001001s | 10 | 11000111s | 9 |
| 26 | 110001011s | 10 | 11010010s | 9 |
| 27 | 110100001s | 10 | 11010011s | 9 |
| 28 | 110100011s | 10 | 11010110s | 9 |
| 29 | 110101001s | 10 | 11010111s | 9 |

TABLE 8-continued

RVLCs for the Motion Vector Data

| Absolute Value of Motion Vector Component (Vertical or Horizontal) | RVLC with k = 1 | | RVLC with k = 2 | |
|---|---|---|---|---|
| | code | length | code | length |
| 30 | 110101011s | 10 | 1000000011s | 11 |
| 31 | 10000000001s | 12 | 1000000011s | 11 |
| 32 | 10000000011s | 12 | 1000000110s | 11 |
| 33 | 10000001001s | 12 | 1000000111s | 11 |
| 34 | 10000001011s | 12 | 1000010010s | 11 |
| 35 | 10000100001s | 12 | 1000010011s | 11 |
| 36 | 10000100011s | 12 | 1000010110s | 11 |
| 37 | 10000101001s | 12 | 1000010111s | 11 |
| 38 | 10000101011s | 12 | 1001000010s | 11 |
| 39 | 10010000001s | 12 | 1001000011s | 11 |
| 40 | 10010000011s | 12 | 1001000110s | 11 |
| 41 | 10010001001s | 12 | 1001000111s | 11 |
| 42 | 10010001011s | 12 | 1001010010s | 11 |
| 43 | 10010100001s | 12 | 1001010011s | 11 |
| 44 | 10010100011s | 12 | 1001010110s | 11 |
| 45 | 10010101001s | 12 | 1001010111s | 11 |
| 46 | 10010101011s | 12 | 1100000011s | 11 |
| 47 | 11000000001s | 12 | 1100000011s | 11 |
| 48 | 11000000011s | 12 | 1100000110s | 11 |
| 49 | 11000001001s | 12 | 1100000111s | 11 |
| 50 | 11000001011s | 12 | 1100010010s | 11 |
| 51 | 11000100001s | 12 | 1100010011s | 11 |
| 52 | 11000100011s | 12 | 1100010110s | 11 |
| 53 | 11000101001s | 12 | 1100010111s | 11 |
| 54 | 11000101011s | 12 | 1101000010s | 11 |
| 55 | 11010000001s | 12 | 1101000011s | 11 |
| 56 | 11010000011s | 12 | 1101000110s | 11 |
| 57 | 11010001001s | 12 | 1101000111s | 11 |
| 58 | 11010001011s | 12 | 1101010010s | 11 |
| 59 | 11010100001s | 12 | 1101010011s | 11 |
| 60 | 11010100011s | 12 | 1101010110s | 11 |
| 61 | 11010101001s | 12 | 0101010111s | 11 |
| 62 | 11010101011s | 12 | 100000000011s | 13 |
| 63 | 1000000000001s | 14 | 100000000011s | 13 |
| 64 | 1000000000011s | 14 | 100000000110s | 13 |
| 65 | 1000000001001s | 14 | 100000000111s | 13 |
| 66 | 1000000001011s | 14 | 100000010010s | 13 |
| 67 | 1000000100001s | 14 | 100000010011s | 13 |
| 68 | 1000000100011s | 14 | 100000010110s | 13 |
| 69 | 1000000101001s | 14 | 100000010111s | 13 |
| 70 | 1000000101011s | 14 | 100001000010s | 13 |
| 71 | 1000010000001s | 14 | 100001000011s | 13 |
| 72 | 1000010000011s | 14 | 100001000110s | 13 |
| 73 | 1000010001001s | 14 | 100001000111s | 13 |
| 74 | 1000010001011s | 14 | 100001010010s | 13 |
| 75 | 1000010100001s | 14 | 100001010011s | 13 |
| 76 | 1000010100011s | 14 | 100001010110s | 13 |
| 77 | 1000010101001s | 14 | 100001010111s | 13 |
| 78 | 1000010101011s | 14 | 100100000011s | 13 |
| 79 | 1001000000001s | 14 | 100100000011s | 13 |
| 80 | 1001000000011s | 14 | 100100000110s | 13 |
| 81 | 1001000001001s | 14 | 100100000111s | 13 |
| 82 | 1001000001011s | 14 | 100100010010s | 13 |
| 83 | 1001000100001s | 14 | 100100010011s | 13 |
| 84 | 1001000100011s | 14 | 100100010110s | 13 |
| 85 | 1001000101001s | 14 | 100100010111s | 13 |
| 86 | 1001000101011s | 14 | 100101000010s | 13 |
| 87 | 1001010000001s | 14 | 100101000011s | 13 |
| 88 | 1001010000011s | 14 | 100101000110s | 13 |
| 89 | 1001010001001s | 14 | 100101000111s | 13 |
| 90 | 1001010001011s | 14 | 100101000111s | 13 |
| 91 | 1001010100001s | 14 | 100101010011s | 13 |
| 92 | 1001010100011s | 14 | 100101010011s | 13 |
| 93 | 1001010101001s | 14 | 100101010111s | 13 |
| 94 | 1001010101011s | 14 | 110000000011s | 13 |
| 95 | 1100000000001s | 14 | 110000000011s | 13 |
| 96 | 1100000000011s | 14 | 110000000110s | 13 |
| 97 | 1100000001001s | 14 | 110000000111s | 13 |
| 98 | 1100000001011s | 14 | 110000010010s | 13 |
| 99 | 1100000100001s | 14 | 110000010011s | 13 |

TABLE 8-continued

RVLCs for the Motion Vector Data

| Absolute Value of Motion Vector Component (Vertical or Horizontal) | RVLC with k = 1 | | RVLC with k = 2 | |
|---|---|---|---|---|
| | code | length | code | length |
| 100 | 1100000100011s | 14 | 110000010110s | 13 |
| 101 | 1100000101001s | 14 | 110000010111s | 13 |
| 102 | 1100000101011s | 14 | 110001000010s | 13 |
| 103 | 1100010000001s | 14 | 110001000011s | 13 |
| 104 | 1100010000011s | 14 | 110001000110s | 13 |
| 105 | 1100010001001s | 14 | 110001000111s | 13 |
| 106 | 1100010001011s | 14 | 110001010010s | 13 |
| 107 | 1100010100001s | 14 | 110001010011s | 13 |
| 108 | 1100010100011s | 14 | 110001010110s | 13 |
| 109 | 1100010101001s | 14 | 110001010111s | 13 |
| 110 | 1100010101011s | 14 | 110100000001s | 13 |
| 111 | 1101000000001s | 14 | 110100000011s | 13 |
| 112 | 1101000000011s | 14 | 110100000110s | 13 |
| 113 | 1101000001111s | 14 | 110100000111s | 13 |
| 114 | 1101000001011s | 14 | 110100010010s | 13 |
| 115 | 1101000100001s | 14 | 110100010011s | 13 |
| 116 | 1001000100011s | 14 | 110100010110s | 13 |
| 117 | 1001000101001s | 14 | 110100010111s | 13 |
| 118 | 1001000101011s | 14 | 110101000010s | 13 |
| 119 | 1001010000001s | 14 | 110101000011s | 13 |
| 120 | 1001010000011s | 14 | 110101000110s | 13 |
| 121 | 1001010001001s | 14 | 110101000111s | 13 |
| 122 | 1001010001011s | 14 | 110101010010s | 13 |
| 123 | 1001010100001s | 14 | 110101010011s | 13 |
| 124 | 1001010100011s | 14 | 110101010110s | 13 |
| 125 | 1001010101001s | 14 | 110101010111s | 13 |
| 126 | 1001010101011s | 14 | 10000000000010s | 15 |
| 127 | 1000000000000001s | 16 | 10000000000011s | 15 |

Alternative RVLCs and Uses

The foregoing preferred embodiment used preferred embodiment RVLCs within a preferred embodiment syntax in which the motion data was partitioned into header data and motion vector data and separated by a Header Resynchronization Word. The preferred embodiment RVLCs can also be used with the data partitioning as in FIG. 6a by using the codes of Table 7 for the DCT data (DCT1, DCT2, . . . DCTn) of FIG. 6c.

Further, an RVLC can be used to code the CBPY plus DQUANT fields.

An alternative preferred embodiment uses the RVLC of Table 8 for the motion vector data without also using the separated header data and header resynchronization word.

Lastly, for other resynchronization markers, other RVLCs can be made in analogous fashions. For example, following Tables 9–11 are other versions of foregoing Tables 4 and 7–8.

TABLE 9

RVLC for COD + MCBPC for INTER coded video packets

| Index | MB Type | CBPC (56) | Proposed RVLC for Combined COD + MCBPC | |
|---|---|---|---|---|
| | | | Codeword (Combined) | Length (Bits) |
| 0 | — | — | 1 | 1 |
| 1 | 0 | 00 | 00 | 2 |
| 2 | 0 | 01 | 0110 | 4 |
| 3 | 0 | 10 | 01110 | 5 |
| 4 | 0 | 11 | 010010 | 6 |
| 5 | 1 | 00 | 011110 | 6 |
| 6 | 1 | 01 | 0111110 | 7 |
| 7 | 1 | 10 | 0100010 | 7 |
| 8 | 1 | 11 | 0101010 | 7 |
| 9 | 2 | 00 | 01111110 | 8 |
| 10 | 2 | 01 | 01000010 | 8 |
| 11 | 2 | 10 | 01011010 | 8 |
| 12 | 2 | 11 | 011111110 | 9 |
| 13 | 3 | 00 | 010000010 | 9 |
| 14 | 3 | 01 | 0101101010 | 11 |
| 15 | 3 | 10 | 0111111110 | 10 |
| 16 | 3 | 11 | 0100000010 | 10 |
| 17 | 4 | 00 | 0101111010 | 10 |
| 18 | 4 | 01 | 0100110010 | 10 |
| 19 | 4 | 10 | 01111111110 | 11 |
| 20 | 4 | 11 | 01000000010 | 11 |
| 21 | Stuffing | — | 01011111010 | 11 |

TABLE 10

RVLCs for the DCT Coefficients. The INTRA column shall be used for INTRA luminance and the INTER column for INTER and INTRA chrominance and INTER luminance

| Index | Intra Last | Intra Run | Intra Level | Inter Last | Inter Run | Inter Level | Sample Code when k = 1 | Sample Code when k = 2 |
|---|---|---|---|---|---|---|---|---|
| 0 | 0 | 0 | 1 | 0 | 0 | 1 | 0s | 00s |
| 1 | 0 | 0 | 2 | 0 | 1 | 1 | 101s | 01s |
| 2 | 0 | 0 | 0 | 0 | 0 | 0 | 1111 ESCAPE | 10101 ESCAPE |
| 3 | 0 | 0 | 3 | 0 | 0 | 2 | 10001s | 1011s |
| 4 | 0 | 0 | 4 | 0 | 0 | 3 | 10011s | 1110s |
| 5 | 0 | 0 | 5 | 0 | 1 | 2 | 11001s | 1111s |
| 6 | 0 | 1 | 1 | 0 | 2 | 1 | 11011s | 100010s |
| 7 | 0 | 1 | 2 | 0 | 3 | 1 | 1000001s | 100011s |
| 8 | 0 | 2 | 1 | 0 | 4 | 1 | 1000011s | 100110s |
| 9 | 1 | 0 | 1 | 1 | 0 | 1 | 1001001s | 100111s |
| 10 | 0 | 0 | 6 | 0 | 0 | 4 | 1001011s | 110010s |
| 11 | 0 | 0 | 7 | 0 | 0 | 5 | 1100001s | 110011s |
| 12 | 0 | 0 | 8 | 0 | 0 | 6 | 1100011s | 110110s |
| 13 | 0 | 0 | 9 | 0 | 0 | 7 | 1101001s | 110111s |
| 14 | 0 | 0 | 10 | 0 | 1 | 3 | 1101011s | 10000010s |
| 15 | 0 | 0 | 11 | 0 | 1 | 4 | 100000001s | 10000011s |
| 16 | 0 | 1 | 3 | 0 | 2 | 2 | 100000011s | 10000110s |
| 17 | 0 | 1 | 4 | 0 | 3 | 2 | 100001001s | 10000111s |
| 18 | 0 | 1 | 5 | 0 | 4 | 2 | 100001011s | 10010010s |
| 19 | 0 | 2 | 2 | 0 | 5 | 1 | 100100001s | 10010011s |
| 20 | 0 | 3 | 1 | 0 | 5 | 2 | 100100011s | 10010110s |
| 21 | 0 | 3 | 2 | 0 | 6 | 1 | 100101001s | 10010111s |
| 22 | 0 | 4 | 1 | 0 | 7 | 1 | 100101011s | 11000010s |
| 23 | 0 | 5 | 1 | 0 | 8 | 1 | 110000001s | 11000011s |
| 24 | 0 | 6 | 1 | 0 | 9 | 1 | 110000011s | 11000110s |
| 25 | 0 | 7 | 1 | 0 | 10 | 1 | 110001001s | 11000111s |
| 26 | 0 | 8 | 1 | 0 | 11 | 1 | 110001011s | 11010010s |
| 27 | 1 | 0 | 2 | 1 | 0 | 2 | 110100001s | 11010011s |
| 28 | 1 | 1 | 1 | 1 | 1 | 1 | 110100011s | 11010110s |
| 29 | 1 | 1 | 2 | 1 | 2 | 1 | 110101001s | 11010111s |
| 30 | 1 | 2 | 1 | 1 | 3 | 1 | 110101011s | 1000000010s |
| 31 | 1 | 3 | 1 | 1 | 4 | 1 | 10000000001s | 1000000011s |
| 32 | 1 | 4 | 1 | 1 | 5 | 1 | 10000000011s | 1000000110s |
| 33 | 1 | 5 | 1 | 1 | 6 | 1 | 10000001001s | 1000000111s |
| 34 | 1 | 6 | 1 | 1 | 7 | 1 | 10000001011s | 1000010010s |
| 35 | 1 | 7 | 1 | 1 | 8 | 1 | 10000100001s | 1000010011s |
| 36 | 1 | 8 | 1 | 1 | 9 | 1 | 10000100011s | 1000010110s |
| 37 | 1 | 9 | 1 | 1 | 10 | 1 | 10000101001s | 1000010111s |
| 38 | 1 | 10 | 1 | 1 | 11 | 1 | 10000101011s | 1001000010s |
| 39 | 1 | 11 | 1 | 1 | 12 | 1 | 10010000001s | 1001000011s |
| 40 | 1 | 12 | 1 | 1 | 13 | 1 | 10010000011s | 1001000110s |
| 41 | 1 | 13 | 1 | 1 | 14 | 1 | 10010001001s | 1001000111s |
| 42 | 0 | 0 | 12 | 0 | 0 | 8 | 10010001011s | 1001010010s |
| 43 | 0 | 0 | 13 | 0 | 0 | 9 | 10010100001s | 1001010011s |
| 44 | 0 | 0 | 14 | 0 | 0 | 10 | 10010100011s | 1001010110s |
| 45 | 0 | 0 | 15 | 0 | 0 | 11 | 10010101001s | 1001010111s |
| 46 | 0 | 0 | 16 | 0 | 0 | 12 | 10010101011s | 1100000010s |
| 47 | 0 | 0 | 17 | 0 | 0 | 13 | 11000000001s | 1100000011s |
| 48 | 0 | 0 | 18 | 0 | 0 | 14 | 11000000011s | 1100000110s |
| 49 | 0 | 0 | 19 | 0 | 0 | 15 | 11000001001s | 1100000111s |
| 50 | 0 | 0 | 20 | 0 | 0 | 16 | 11000001011s | 1100010010s |
| 51 | 0 | 0 | 21 | 0 | 0 | 17 | 11000100001s | 1100010011s |
| 52 | 0 | 0 | 22 | 0 | 0 | 18 | 11000100011s | 1100010110s |
| 53 | 0 | 0 | 23 | 0 | 0 | 19 | 11000101001s | 1100010111s |
| 54 | 0 | 0 | 24 | 0 | 0 | 20 | 11000101011s | 1101000010s |
| 55 | 0 | 0 | 25 | 0 | 0 | 21 | 11010000001s | 1101000011s |
| 56 | 0 | 0 | 26 | 0 | 0 | 22 | 11010000011s | 1101000110s |
| 57 | 0 | 0 | 27 | 0 | 0 | 23 | 11010001001s | 1101000111s |
| 58 | 0 | 0 | 28 | 0 | 0 | 24 | 11010001011s | 1101010010s |
| 59 | 0 | 0 | 29 | 0 | 0 | 25 | 11010100001s | 1101010011s |
| 60 | 0 | 0 | 30 | 0 | 0 | 26 | 11010100011s | 1101010110s |
| 61 | 0 | 0 | 31 | 0 | 0 | 27 | 11010101001s | 1101010111s |
| 62 | 0 | 0 | 32 | 0 | 1 | 5 | 11010101011s | 100000000010s |
| 63 | 0 | 0 | 33 | 0 | 1 | 6 | 1000000000001s | 100000000011s |
| 64 | 0 | 0 | 34 | 0 | 1 | 7 | 1000000000011s | 100000000110s |
| 65 | 0 | 1 | 6 | 0 | 1 | 8 | 1000000001001s | 100000000111s |
| 66 | 0 | 1 | 7 | 0 | 1 | 9 | 1000000001011s | 100000010010s |
| 67 | 0 | 1 | 8 | 0 | 1 | 10 | 1000000100001s | 100000010011s |
| 68 | 0 | 1 | 9 | 0 | 1 | 11 | 1000000100011s | 100000010110s |
| 69 | 0 | 1 | 10 | 0 | 1 | 12 | 1000000101001s | 100000010111s |

TABLE 10-continued

RVLCs for the DCT Coefficients. The INTRA column shall be used for INTRA luminance and the INTER column for INTER and INTRA chrominance and INTER luminance

| | Intra | | | Inter | | | Sample Code when | Sample Code when |
|---|---|---|---|---|---|---|---|---|
| Index | Last | Run | Level | Last | Run | Level | k = 1 | k = 2 |
| 70 | 0 | 1 | 11 | 0 | 2 | 3 | 1000000101011s | 100001000010s |
| 71 | 0 | 1 | 12 | 0 | 2 | 4 | 1000010000001s | 100001000011s |
| 72 | 0 | 1 | 13 | 0 | 2 | 5 | 1000010000011s | 100001000110s |
| 73 | 0 | 1 | 14 | 0 | 2 | 6 | 1000010001001s | 100001000111s |
| 74 | 0 | 1 | 15 | 0 | 2 | 7 | 1000010001011s | 100001010010s |
| 75 | 0 | 1 | 16 | 0 | 2 | 8 | 1000010100001s | 100001010011s |
| 76 | 0 | 2 | 3 | 0 | 3 | 3 | 1000010100011s | 100001010110s |
| 77 | 0 | 2 | 4 | 0 | 3 | 4 | 1000010101001s | 100001010111s |
| 78 | 0 | 2 | 5 | 0 | 3 | 5 | 1000010101011s | 100100000010s |
| 79 | 0 | 2 | 6 | 0 | 3 | 6 | 1001000000001s | 100100000011s |
| 80 | 0 | 2 | 7 | 0 | 4 | 3 | 1001000000011s | 100100000110s |
| 81 | 0 | 2 | 8 | 0 | 4 | 4 | 1001000001001s | 100100000111s |
| 82 | 0 | 3 | 3 | 0 | 4 | 5 | 1001000001011s | 100100010010s |
| 83 | 0 | 3 | 4 | 0 | 5 | 3 | 1001000100001s | 100100010011s |
| 84 | 0 | 3 | 5 | 0 | 5 | 4 | 1001000100011s | 100100010110s |
| 85 | 0 | 3 | 6 | 0 | 5 | 5 | 1001000101001s | 100100010111s |
| 86 | 0 | 3 | 7 | 0 | 6 | 2 | 1001000101011s | 100101000010s |
| 87 | 0 | 3 | 8 | 0 | 6 | 3 | 1001010000001s | 100101000011s |
| 88 | 0 | 3 | 9 | 0 | 6 | 4 | 1001010000011s | 100101000110s |
| 89 | 0 | 4 | 2 | 0 | 7 | 2 | 1001010001001s | 100101000111s |
| 90 | 0 | 4 | 3 | 0 | 7 | 3 | 1001010001011s | 100101010010s |
| 91 | 0 | 4 | 4 | 0 | 7 | 4 | 1001010100001s | 100101010011s |
| 92 | 0 | 4 | 5 | 0 | 8 | 2 | 1001010100011s | 100101010110s |
| 93 | 0 | 5 | 2 | 0 | 8 | 3 | 1001010101001s | 100101010111s |
| 94 | 0 | 5 | 3 | 0 | 8 | 4 | 1001010101011s | 110000000010s |
| 95 | 0 | 5 | 4 | 0 | 9 | 2 | 1100000000001s | 110000000011s |
| 96 | 0 | 5 | 5 | 0 | 9 | 3 | 1100000000011s | 110000000110s |
| 97 | 0 | 5 | 6 | 0 | 9 | 4 | 1100000001001s | 110000000111s |
| 98 | 0 | 5 | 7 | 0 | 10 | 2 | 1100000001011s | 110000010010s |
| 99 | 0 | 5 | 8 | 0 | 10 | 3 | 1100000100001s | 110000010011s |
| 100 | 0 | 6 | 2 | 0 | 11 | 2 | 1100000100011s | 110000010110s |
| 101 | 0 | 6 | 3 | 0 | 12 | 1 | 1100000101001s | 110000010111s |
| 102 | 0 | 6 | 4 | 0 | 12 | 2 | 1100000101011s | 110001000010s |
| 103 | 0 | 7 | 2 | 0 | 13 | 1 | 1100010000001s | 110001000011s |
| 104 | 0 | 7 | 3 | 0 | 13 | 2 | 1100010000011s | 110001000110s |
| 105 | 0 | 7 | 4 | 0 | 14 | 1 | 1100010001001s | 110001000111s |
| 106 | 0 | 7 | 5 | 0 | 14 | 2 | 1100010001011s | 110001010010s |
| 107 | 0 | 7 | 7 | 0 | 15 | 1 | 1100010100001s | 110001010011s |
| 108 | 0 | 8 | 2 | 0 | 15 | 2 | 1100010100011s | 110001010110s |
| 109 | 0 | 8 | 3 | 0 | 16 | 1 | 1100010101001s | 110001010111s |
| 110 | 0 | 9 | 1 | 0 | 17 | 1 | 1100010101011s | 110100000010s |
| 111 | 0 | 9 | 2 | 0 | 18 | 1 | 1101000000001s | 110100000011s |
| 112 | 0 | 9 | 3 | 0 | 19 | 1 | 1101000000011s | 110100000110s |
| 113 | 0 | 9 | 4 | 0 | 20 | 1 | 1101000001001s | 110100000111s |
| 114 | 0 | 9 | 5 | 0 | 21 | 1 | 1101000001011s | 110100010010s |
| 115 | 0 | 10 | 1 | 0 | 22 | 1 | 1101000100001s | 110100010011s |
| 116 | 0 | 10 | 2 | 0 | 23 | 1 | 1101000100011s | 110100010110s |
| 117 | 0 | 11 | 1 | 0 | 24 | 1 | 1101000100001s | 110100010111s |
| 118 | 0 | 11 | 2 | 0 | 25 | 1 | 1101000101011s | 110101000010s |
| 119 | 0 | 12 | 1 | 0 | 26 | 1 | 1101010000001s | 110101000011s |
| 120 | 0 | 13 | 1 | 0 | 27 | 1 | 1101010000011s | 110101000110s |
| 121 | 0 | 14 | 1 | 0 | 30 | 1 | 1101010001001s | 110101000111s |
| 122 | 0 | 15 | 1 | 0 | 31 | 1 | 1101010001011s | 110101010010s |
| 123 | 0 | 16 | 1 | 0 | 32 | 1 | 1101010100001s | 110101010011s |
| 124 | 1 | 0 | 3 | 1 | 0 | 3 | 1101010100011s | 110101010110s |
| 125 | 1 | 0 | 4 | 1 | 0 | 4 | 1101010101001s | 110101010111s |
| 126 | 1 | 0 | 5 | 1 | 0 | 5 | 1101010101011s | 100000000000010s |
| 127 | 1 | 0 | 6 | 1 | 1 | 2 | 100000000000001s | 10000000000011s |
| 128 | 1 | 1 | 3 | 1 | 1 | 3 | 100000000000011s | 10000000000110s |
| 129 | 1 | 1 | 4 | 1 | 2 | 2 | 100000000001001s | 10000000000111s |
| 130 | 1 | 1 | 5 | 1 | 2 | 3 | 100000000001011s | 10000000010010s |
| 131 | 1 | 1 | 6 | 1 | 3 | 2 | 100000000100001s | 10000000010011s |
| 132 | 1 | 2 | 2 | 1 | 4 | 2 | 100000000100011s | 10000000010110s |
| 133 | 1 | 2 | 3 | 1 | 5 | 2 | 100000000101001s | 10000000010111s |
| 134 | 1 | 3 | 2 | 1 | 6 | 2 | 100000000101011s | 10000001000010s |
| 135 | 1 | 3 | 3 | 1 | 7 | 2 | 100000010000001s | 10000001000011s |
| 136 | 1 | 4 | 2 | 1 | 8 | 2 | 100000010000011s | 10000001000110s |
| 137 | 1 | 5 | 2 | 1 | 9 | 2 | 100000010001001s | 10000001000111s |
| 138 | 1 | 5 | 3 | 1 | 10 | 2 | 100000010001011s | 10000001010010s |
| 139 | 1 | 6 | 2 | 1 | 11 | 2 | 100000010100001s | 10000001010011s |
| 140 | 1 | 6 | 3 | 1 | 12 | 2 | 100000010100011s | 10000001010110s |

TABLE 10-continued

RVLCs for the DCT Coefficients. The INTRA column shall be used for INTRA luminance and the INTER column for INTER and INTRA chrominance and INTER luminance

| | Intra | | | Inter | | | Sample Code when | Sample Code when |
|---|---|---|---|---|---|---|---|---|
| Index | Last | Run | Level | Last | Run | Level | k = 1 | k = 2 |
| 141 | 1 | 7 | 2 | 1 | 13 | 2 | 100000010101001s | 10000001010111s |
| 142 | 1 | 7 | 3 | 1 | 15 | 1 | 100000010101011s | 10000100000010s |
| 143 | 1 | 8 | 2 | 1 | 16 | 1 | 100001000000001s | 10000100000011s |
| 144 | 1 | 9 | 2 | 1 | 17 | 1 | 100001000000011s | 10000100000110s |
| 145 | 1 | 9 | 3 | 1 | 18 | 1 | 100001000001001s | 10000100000111s |
| 146 | 1 | 10 | 2 | 1 | 19 | 1 | 100001000001011s | 10000100010010s |
| 147 | 1 | 11 | 2 | 1 | 20 | 1 | 100001000100001s | 10000100010011s |
| 148 | 1 | 11 | 3 | 1 | 21 | 1 | 100001000100011s | 10000100010110s |
| 149 | 1 | 12 | 2 | 1 | 22 | 1 | 100001000101001s | 10000100010111s |
| 150 | 1 | 13 | 3 | 1 | 24 | 1 | 100001000101011s | 10000101000010s |
| 151 | 1 | 13 | 3 | 1 | 24 | 1 | 100001010000001s | 10000101000011s |
| 152 | 1 | 13 | 4 | 1 | 25 | 1 | 100001010000011s | 10000101000110s |
| 153 | 1 | 14 | 1 | 1 | 26 | 1 | 100001010001001s | 10000101000111s |
| 154 | 1 | 14 | 2 | 1 | 27 | 1 | 100001010001011s | 10000101010010s |
| 155 | 1 | 15 | 1 | 1 | 28 | 1 | 100001010100001s | 10000101010011s |
| 156 | 1 | 16 | 1 | 1 | 29 | 1 | 100001010100011s | 10000101010110s |
| 157 | 1 | 17 | 1 | 1 | 30 | 1 | 100001010101001s | 10000101010111s |
| 158 | 1 | 18 | 1 | 1 | 31 | 1 | 100001010101011s | 10010000000010s |
| 159 | 1 | 19 | 1 | 1 | 32 | 1 | 100100000000001s | 10010000000011s |
| 160 | 1 | 20 | 1 | 1 | 33 | 1 | 100100000000011s | 10010000000110s |
| 161 | 1 | 21 | 1 | 1 | 34 | 1 | 100100000001001s | 10010000000111s |
| 162 | 1 | 22 | 1 | 1 | 35 | 1 | 100100000001011s | 10010000010010s |
| 163 | 1 | 23 | 1 | 1 | 36 | 1 | 100100000100001s | 10010000010011s |
| 164 | 1 | 24 | 1 | 1 | 37 | 1 | 100100000100011s | 10010000010110s |
| 165 | 1 | 25 | 1 | 1 | 38 | 1 | 100100000101001s | 10010000010111s |
| 166 | 1 | 26 | 1 | 1 | 39 | 1 | 100100000101011s | 10010001000010s |
| 167 | 1 | 27 | 1 | 1 | 40 | 1 | 100100010000001s | 10010001000011s |
| 168 | 1 | 28 | 1 | 1 | 45 | 1 | 100100010000011s | 10010001000110s |
| 169 | 1 | 30 | 1 | 1 | 46 | 1 | 100100010001001s | 10010001000111s |

TABLE 11

RVLCs for the Motion Vector Data

| Absolute Value of Motion Vector Component (Vertical or Horizontal) | RVLC with k = 1 | | RVLC with k = 2 | |
|---|---|---|---|---|
| | code | length | code | length |
| 0 | 00 | 2 | 000 | 3 |
| 1 | 101s | 4 | 01s | 3 |
| 2 | 111s | 4 | 1010s | 5 |
| 3 | 10001s | 6 | 1011s | 5 |
| 4 | 10011s | 6 | 1110s | 5 |
| 5 | 11001s | 6 | 1111s | 5 |
| 6 | 11011s | 6 | 100010s | 7 |
| 7 | 1000001s | 8 | 100011s | 7 |
| 8 | 1000011s | 8 | 100110s | 7 |
| 9 | 1001001s | 8 | 100111s | 7 |
| 10 | 1001011s | 8 | 110010s | 7 |
| 11 | 1100001s | 8 | 110011s | 7 |
| 12 | 1100011s | 8 | 110110s | 7 |
| 13 | 1101001s | 8 | 110111s | 7 |
| 14 | 1101011s | 8 | 10000010s | 9 |
| 15 | 100000001s | 10 | 10000011s | 9 |
| 16 | 100000011s | 10 | 10000110s | 9 |
| 17 | 100001001s | 10 | 10000111s | 9 |
| 18 | 100001011s | 10 | 10010010s | 9 |
| 19 | 100100001s | 10 | 10010011s | 9 |
| 20 | 100100011s | 10 | 10010110s | 9 |
| 21 | 100101001s | 10 | 10010111s | 9 |
| 22 | 100101011s | 10 | 11000010s | 9 |
| 23 | 110000001s | 10 | 11000011s | 9 |
| 24 | 110000011s | 10 | 11000110s | 9 |
| 25 | 110001001s | 10 | 11000111s | 9 |
| 26 | 110001011s | 10 | 11010010s | 9 |

TABLE 11-continued

RVLCs for the Motion Vector Data

| Absolute Value of Motion Vector Component (Vertical or Horizontal) | RVLC with k = 1 | | RVLC with k = 2 | |
|---|---|---|---|---|
| | code | length | code | length |
| 27 | 110100001s | 10 | 11010011s | 9 |
| 28 | 110100011s | 10 | 11010110s | 9 |
| 29 | 110101001s | 10 | 11010111s | 9 |
| 30 | 110101011s | 10 | 1000000011s | 11 |
| 31 | 10000000001s | 12 | 1000000011s | 11 |
| 32 | 10000000011s | 12 | 1000000110s | 11 |
| 33 | 10000001001s | 12 | 1000000111s | 11 |
| 34 | 10000001011s | 12 | 1000010010s | 11 |
| 35 | 10000100001s | 12 | 1000010011s | 11 |
| 36 | 10000100011s | 12 | 1000010110s | 11 |
| 37 | 10000101001s | 12 | 1000010111s | 11 |
| 38 | 10000101011s | 12 | 1001000010s | 11 |
| 39 | 10010000001s | 12 | 1001000011s | 11 |
| 40 | 10010000011s | 12 | 1001000110s | 11 |
| 41 | 10010001001s | 12 | 1001000111s | 11 |
| 42 | 10010001011s | 12 | 1001010010s | 11 |
| 43 | 10010100001s | 12 | 1001010011s | 11 |
| 44 | 10010100011s | 12 | 1001010110s | 11 |
| 45 | 10010101001s | 12 | 1001010111s | 11 |
| 46 | 10010101011s | 12 | 1100000011s | 11 |
| 47 | 11000000001s | 12 | 1100000011s | 11 |
| 48 | 11000000011s | 12 | 1100000110s | 11 |
| 49 | 11000001001s | 12 | 1100000111s | 11 |
| 50 | 11000001011s | 12 | 1100010010s | 11 |
| 51 | 11000100001s | 12 | 1100010011s | 11 |
| 52 | 11000100011s | 12 | 1100010110s | 11 |
| 53 | 11000101001s | 12 | 1100010111s | 11 |
| 54 | 11000101011s | 12 | 1101000010s | 11 |
| 55 | 11010000001s | 12 | 1101000011s | 11 |
| 56 | 11010000011s | 12 | 1101000110s | 11 |
| 57 | 11010001001s | 12 | 1101000111s | 11 |
| 58 | 11010001011s | 12 | 1101010010s | 11 |
| 59 | 11010100001s | 12 | 1101010011s | 11 |
| 60 | 11010100011s | 12 | 1101010110s | 11 |
| 61 | 11010101001s | 12 | 0101010111s | 11 |
| 62 | 11010101011s | 12 | 100000000011s | 13 |
| 63 | 1000000000001s | 14 | 100000000011s | 13 |
| 64 | 1000000000011s | 14 | 100000000110s | 13 |
| 65 | 1000000001001s | 14 | 100000000111s | 13 |
| 66 | 1000000001011s | 14 | 100000010010s | 13 |
| 67 | 1000000100001s | 14 | 100000010011s | 13 |
| 68 | 1000000100011s | 14 | 100000010110s | 13 |
| 69 | 1000000101001s | 14 | 100000010111s | 13 |
| 70 | 1000000101011s | 14 | 100001000010s | 13 |
| 71 | 1000010000001s | 14 | 100001000011s | 13 |
| 72 | 1000010000011s | 14 | 100001000110s | 13 |
| 73 | 1000010001001s | 14 | 100001000111s | 13 |
| 74 | 1000010001011s | 14 | 100001010010s | 13 |
| 75 | 1000010100001s | 14 | 100001010011s | 13 |
| 76 | 1000010100011s | 14 | 100001010110s | 13 |
| 77 | 1000010101001s | 14 | 100001010111s | 13 |
| 78 | 1000010101011s | 14 | 100100000011s | 13 |
| 79 | 1001000000001s | 14 | 100100000011s | 13 |
| 80 | 1001000000011s | 14 | 100100000110s | 13 |
| 81 | 1001000001001s | 14 | 100100000111s | 13 |
| 82 | 1001000001011s | 14 | 100100010010s | 13 |
| 83 | 1001000100001s | 14 | 100100010011s | 13 |
| 84 | 1001000100011s | 14 | 100100010110s | 13 |
| 85 | 1001000101001s | 14 | 100100010111s | 13 |
| 86 | 1001000101011s | 14 | 100101000010s | 13 |
| 87 | 1001010000001s | 14 | 100101000011s | 13 |
| 88 | 1001010000011s | 14 | 100101000110s | 13 |
| 89 | 1001010001001s | 14 | 100101000111s | 13 |
| 90 | 1001010001011s | 14 | 100101010010s | 13 |
| 91 | 1001010100001s | 14 | 100101010011s | 13 |
| 92 | 1001010100011s | 14 | 100101010110s | 13 |
| 93 | 1001010101001s | 14 | 100101010111s | 13 |
| 94 | 1001010101011s | 14 | 110000000011s | 13 |
| 95 | 1100000000001s | 14 | 110000000011s | 13 |
| 96 | 1100000000011s | 14 | 110000000110s | 13 |

TABLE 11-continued

RVLCs for the Motion Vector Data

| Absolute Value of Motion Vector Component (Vertical or Horizontal) | RVLC with k = 1 | | RVLC with k = 2 | |
|---|---|---|---|---|
| | code | length | code | length |
| 97 | 1100000001001s | 14 | 110000000111s | 13 |
| 98 | 1100000001011s | 14 | 110000010010s | 13 |
| 99 | 1100000100001s | 14 | 110000010011s | 13 |
| 100 | 1100000100011s | 14 | 110000010110s | 13 |
| 101 | 1100000101001s | 14 | 110000010111s | 13 |
| 102 | 1100000101011s | 14 | 110001000010s | 13 |
| 103 | 1100010000001s | 14 | 110001000011s | 13 |
| 104 | 1100010000011s | 14 | 110001000110s | 13 |
| 105 | 1100010001001s | 14 | 110001000111s | 13 |
| 106 | 1100010001011s | 14 | 110001010010s | 13 |
| 107 | 1100010100001s | 14 | 110001010011s | 13 |
| 108 | 1100010100011s | 14 | 110001010110s | 13 |
| 109 | 1100010101001s | 14 | 110001010111s | 13 |
| 110 | 1101000000011s | 14 | 110100000001s | 13 |
| 111 | 1101000000001s | 14 | 110100000011s | 13 |
| 112 | 1101000000011s | 14 | 110100000110s | 13 |
| 113 | 1101000001001s | 14 | 110100000111s | 13 |
| 114 | 1101000001011s | 14 | 110100010010s | 13 |
| 115 | 1101000100001s | 14 | 110100010011s | 13 |
| 116 | 1001000100011s | 14 | 110100010110s | 13 |
| 117 | 1001000101001s | 14 | 110100010111s | 13 |
| 118 | 1001000101011s | 14 | 110101000010s | 13 |
| 119 | 1001010000001s | 14 | 110101000011s | 13 |
| 120 | 1001010000011s | 14 | 110101000110s | 13 |
| 121 | 1001010001001s | 14 | 110101000111s | 13 |
| 122 | 1001010001011s | 14 | 110101010010s | 13 |
| 123 | 1001010100001s | 14 | 110101010011s | 13 |
| 124 | 1001010100011s | 14 | 110101010110s | 13 |
| 125 | 1001010101001s | 14 | 110101010111s | 13 |
| 126 | 1001010101011s | 14 | 10000000000010s | 15 |
| 127 | 100000000000001s | 16 | 10000000000011s | 15 |

Object Based Compression

The foregoing RVLCs and bitstream syntax also extends to object based compression by just including the object shape data in a field (typically preceding the motion data) and optionally with a Shape Resynchronization Word to separate shape data from motion data.

What is claimed is:

1. A method of decoding a compressed video bit stream packet, comprising the steps of:

(a) interpreting codewords as reversible exp-Golomb type codewords; and
   (b) decoding in both forward and backward directions when an error is indicated.

2. The method of claim 1, wherein:
   (a) portions of said packet between errors found in said forward and backward decodings are discarded.

3. The method of claim 1, wherein:
   (a) said reversible exp-Golomb type code has codewords with a symmetrical prefix portion plus a suffix portion of a first length.

4. The method of claim 1, wherein:
   (a) said reversible exp-Golomb type code has codewords including a portion with symmetrical odd-numbered bits.

5. The method of claim 4, wherein:
   (a) said portion has the format 1x0x0x...x0x1, where the x's represent information bits.

* * * * *

UNITED STATES PATENT AND TRADEMARK OFFICE
CERTIFICATE OF CORRECTION

PATENT NO.     : 6,385,251 B1
DATED          : May 7, 2002
INVENTOR(S)    : Rajendra K. Talluri, Jiangtao Wen and John Villasenor It is certified that error appears in the above-identified patent and that said Letters Patent is hereby corrected as shown below:

<u>Title page,</u>
Item [73], Assignee, below "Texas Instruments Incorporated, Dallas, TX (US)" add
-- Regents of the University of California, Oakland, CA (US) --.

Signed and Sealed this

Twenty-seventh Day of April, 2004

JON W. DUDAS
*Acting Director of the United States Patent and Trademark Office*